(12) United States Patent
Julien et al.

(10) Patent No.: US 8,802,182 B2
(45) Date of Patent: Aug. 12, 2014

(54) BREAD-MAKING IMPROVER

(75) Inventors: Pascal Julien, Marcq en Baroeul (FR); Marie-Pierre Lejeune-Luquet, Tourcoing (FR); Eric Schubert, Saint Maurice (FR)

(73) Assignee: Lesaffre et Compagnie, Paris (FR)

( * ) Notice: Subject to any disclaimer, the term of this patent is extended or adjusted under 35 U.S.C. 154(b) by 1107 days.

(21) Appl. No.: 11/547,192

(22) PCT Filed: Mar. 31, 2005

(86) PCT No.: PCT/EP2005/003377
§ 371 (c)(1),
(2), (4) Date: Oct. 9, 2007

(87) PCT Pub. No.: WO2005/104856
PCT Pub. Date: Nov. 10, 2005

(65) Prior Publication Data
US 2008/0248159 A1    Oct. 9, 2008

(30) Foreign Application Priority Data
Mar. 31, 2004  (EP) .................................. 04007791

(51) Int. Cl.
*A21D 2/08* (2006.01)

(52) U.S. Cl.
USPC .............. 426/654; 426/653; 426/649; 426/18

(58) Field of Classification Search
CPC .......... A21D 2/22; A21D 2/145; A21D 2/264
See application file for complete search history.

(56) References Cited

U.S. PATENT DOCUMENTS

| | | | | |
|---|---|---|---|---|
| 2,978,385 A | * | 4/1961 | Damaskus | .................... 435/188 |
| 3,019,171 A | * | 1/1962 | Bloch et al. | ................. 424/94.65 |
| 3,108,878 A | * | 10/1963 | Higashiuchi et al. | ........... 426/21 |
| 3,578,462 A | * | 5/1971 | Smerak et al. | .................. 426/20 |
| 3,650,764 A | | 3/1972 | Duquette | |
| 4,642,237 A | | 2/1987 | De Stefanis et al. | |
| 4,855,149 A | * | 8/1989 | Pucci et al. | ..................... 426/48 |
| 5,514,404 A | * | 5/1996 | Zimmerman et al. | ........ 426/549 |
| 5,554,403 A | * | 9/1996 | Nakamura et al. | ............ 426/549 |
| 6,475,759 B1 | * | 11/2002 | Carlson et al. | ................. 435/139 |
| 6,579,546 B1 | * | 6/2003 | Jahnke | ............................. 426/19 |
| RE38,507 E | * | 4/2004 | Olesen | ............................. 426/20 |
| 2003/0190399 A1 | * | 10/2003 | Schooneveld-Bergmans et al. | ............................ 426/549 |
| 2004/0028773 A1 | * | 2/2004 | Sturkenboom et al. | .......... 426/20 |

FOREIGN PATENT DOCUMENTS

| | | |
|---|---|---|
| EP | 0 669 082 A1 | 8/1995 |
| EP | 0 943 242 A | 9/1999 |
| EP | 1 008 309 A | 6/2000 |
| FR | 2 315 852 A | 1/1977 |
| RU | 2 158 513 C | 1/2000 |
| WO | 96/13980 A1 | 5/1996 |
| WO | WO 02/19828 A | 3/2002 |
| WO | WO 2004/084639 | * 10/2004 |

OTHER PUBLICATIONS

USDA "Safe Food Handling" http://www.fsis.usda.gov/FACTSheets/Refrigeration_&_Food_Safety/index.asp#4. May 11, 2010 pp. 1-5.*
International Search Report.

* cited by examiner

*Primary Examiner* — Lien T. Tran
*Assistant Examiner* — Felicia King
(74) *Attorney, Agent, or Firm* — Sughrue Mion, PLLC

(57) ABSTRACT

A solid breadmaking improver whose dry matter consists essentially of one or two water-soluble food ingredients and at least one enzyme. The solid improver contains ascorbic acid and results, after dispersion of 10 g of improver in 100 g of distilled water, in liquid having a pH of 3.8 to 7.0, said liquid improver being obtained by dispersion of the solid improver in an aqueous phase.

33 Claims, No Drawings

BREAD-MAKING IMPROVER

The invention relates to a bread-making improver containing at least one enzyme.

The use of bread-making improvers having enzymatic activity has long been known.

In particular, said enzymatic improvers are known to be used in powder form. They have a certain number of drawbacks. Powdered enzymatic improvers tend to disperse in air and deposit dust throughout the bakery. This not only requires frequent cleaning of the working area, but can also cause allergic reactions in workers. Powders are also difficult to dose by automated methods.

These problems have only been partially resolved by the use of enzymatic improvers in granular form.

Solid and fluid enzymatic improvers are disclosed in particular in U.S. Pat. No. 3,650,764-A and in the patent application FR2 315 852-A. Improvers in granular form are described in particular in patent applications EP1 008 309-A1 and EP0 943 242-A1. U.S. Pat. No. 4,642,237-A also proposes the packaging of solid bread-making improvers in the form of bars or tablets.

The use of liquid enzymatic improvers has also been proposed. In fact, said liquid improvers have the advantage that they do not disperse in air and thereby lower the risk of allergic reactions in workers. Liquid improvers can also be dosed automatically, provided that said liquid improver is homogeneous at the time of dosing. However, liquid improvers are usually formulated with liquid fat ingredients or with polyols, which are not authorized in certain bread-making formulas and/or in certain countries. Furthermore, today's consumers do not always favorably look upon the presence of fats.

Another drawback of liquid improvers is that they are costly to transport due to the fact that the volumes to be transported are much larger, since the active ingredients are diluted in the liquid phase. Given their larger volume, liquid improvers generally require hygienic transport containers which are more expensive and bulkier, as is true in particular for such rigid containers. This requires the baker to set aside considerable space in his work area to store empty containers. In addition, in a growing number of countries, this type of packaging is either returnable and collected by the producer of the improver, or subjected to a so-called "ecological" fee.

The invention discloses a method of preparation in the bakery of a liquid bread-making improver, said method comprising the dispersion of a particular solid bread-making improver containing at least one enzyme. Said method combines the advantages of the two types of enzymatic improvers described hereinabove.

To this end, the invention proposes a solid improver with enzymatic activity having a composition specifically designed to allow the baker to produce, in the bakery, a high quality liquid improver by simply dispersing said solid improver in an aqueous phase.

In particular, the invention has as object a method of preparation in the bakery of a liquid bread-making improver, said method comprising the dispersion in an aqueous liquid phase, preferably water, of a solid bread-making improver, said solid improver:
  having a dry matter content greater than or equal to 80% by mass, said dry matter essentially consisting of one or more water-soluble food ingredients and at least one enzyme;
  containing ascorbic acid;
  resulting, after dispersion of 10 parts by weight of solid improver in 100 parts by weight of distilled water, in a liquid having a pH of 3.8 to 7.0; preferably of 4.0 to 6.5; more preferably of 4.5 to 6.3; and even more preferably of 5.0 to 6.0.

According to the invention, the dry matters of the solid bread-making improver consist essentially, that is to say, for at least 80% by mass, of one or more water-soluble food ingredients and at least one enzyme. Preferably, the dry matters of the improver consist for at least 90% by mass, preferably at least 95% by mass, more preferably at least 97% by mass and even more preferably at least 99% by mass, of one or more enzymes and one or more water-soluble food ingredients.

In the spirit of the invention, the term "water-soluble ingredient" is understood to mean an ingredient which can completely dissolve in distilled water at 10° C., and preferably also at 2° C., at a mass content relative to the distilled water which is at least that of its content in the liquid improver obtained according to the invention from the solid improver; and whose aqueous solutions remain stable without stirring, for at least 24 hours, preferably for at least 48 hours. Preferably, a "water-soluble ingredient" is an ingredient which can dissolve in drinking water at a temperature comprised between +1° C. and +20° C., at a mass content relative to the quantity of drinking water, of at least 1%, preferably at least 5%, and more preferably at least 20%, the drinking water being defined by Directive 98/83/CE of Council dated 3 Nov. 1998. Such water-soluble ingredients are exemplified by food salts which dissolve in water. Wheat flour is an example of a non-water-soluble ingredient.

It goes without saying that the ingredients of the solid bread-making improver are selected from ingredients suitable for bread-making.

According to the invention, the solid bread-making improver contains in particular the antioxidant ascorbic acid as water-soluble food ingredient, it being recalled that ascorbic acid is immediately oxidized in the dough and subsequently plays a role of dough oxidant.

According to the invention, the solid bread-making improver has a dry matter content of at least 80% by mass. In particular, the solid improver can have a dry matter content of at least 90% by mass, preferably at least 95% by mass and more preferably at least 97% by mass.

According to the invention, the water-soluble food ingredients of the solid improver, and the concentrations and ratios thereof, are selected so that, after dispersion of 10 parts by weight of solid improver in 100 parts by weight of distilled water, the liquid obtained has a pH of 3.8 to 7.0; preferably of 4.0 to 6.5; more preferably of 4.5 to 6.3; and even more preferably of 5.0 to 6.0.

As indicated earlier, according to the invention, the solid bread-making improver enables the baker to produce, in the bakery, a liquid enzymatic improver by dispersing the solid improver in an aqueous phase. It is obvious that the baker will not normally use distilled water to produce the liquid improver. In general, the baker will produce the liquid improver by dispersing the solid improver in part of the dough added water. In the context of the description of the invention, some characteristics of the solid improver have nonetheless been defined on the basis of a test comprising the dispersion of 10 parts by weight of solid improver in 100 parts by weight of distilled water in order to ensure the reproducibility of the assay.

In the spirit of the invention, the term bakery designates any bakery such as in particular the industrial bakery and the craft bakery.

According to the invention, the solid improver preferably contains one or more water-soluble food buffer ingredients, the buffer ingredients, in accordance with the definition given in Rompp Lexikon Chemie (10$^{th}$ edition, 1999, Band 5 (ISBN 3-13-735010-7), page 3618), corresponding to:

salts of a weak acid with a strong base,
salts of a strong acid with a weak base,
combinations of a weak acid with at least one of its salts.

Preferably, the buffer ingredients are selected from the family of salts of a weak acid with a strong base.

Preferably, the ingredients of the solid improver, and in particular the water-soluble food ingredients thereof, such as the buffer ingredients, and the concentrations and ratios thereof are selected so that, after dispersion of 10 parts by weight of solid improver in 100 parts by weight of distilled water, a liquid is obtained having a buffering power such that the addition of 1 ml of 1N HCl to 110 g of said liquid produces a pH variation (absolute value) less than or equal to 0.50; preferably less than or equal to 0.20; more preferably less than or equal to 0.10; and even more preferably less than or equal to 0.08.

Preferably, the solid bread-making improver displays at least one of the following characteristics a, b, c and d, preferably two, and more preferably three of the following characteristics a, b, c and d:

a) a dry matter content greater than or equal to 90% by mass, preferably greater than or equal to 95% by mass and more preferably greater than or equal to 97% by mass;

b) the dry matters consist for at least 90% by mass, preferably for at least 95% by mass, preferably for at least 97% by mass, more preferably for at least 99% by mass, of one or more enzymes and one or more water-soluble ingredient(s);

c) it contains at least one water-soluble food ingredient selected in the group consisting of buffer ingredients, buffer ingredients being defined as:

salts of a weak acid with a strong base,
salts of a strong acid with a weak base, and
combinations of a weak acid with at least one of its salts.

d) 10 parts by weight of said solid improver dispersed in 100 parts by weight of distilled water result in a liquid having a buffering power such that the addition of 1 ml of 1N HCl to 110 g of said liquid produces a pH variation less than or equal to 0.50; preferably less than or equal to 0.20; more preferably less than or equal to 0.10; and even more preferably less than or equal to 0.08.

Thus, the solid bread-making improver can display one of the following combinations of said characteristics: a and b; a and c; a and d; b and c; b and d; c and d; and more preferably a, b and c; b, c and d; a, c and d; or d, a and b.

Preferably, the solid bread-making improver displays the four aforementioned characteristics a, b, c and d.

According to the invention, the solid bread-making improver enables in particular, the production, after dispersion in an aqueous phase, preferably water, of a liquid enzymatic improver which can be stored for at least 24 hours at a temperature of less than 10° C., preferably for 48 hours, and this without significant loss of efficacy as bread-making improver. In a preferred manner, the liquid improver is prepared in "batch", that is to say, in a final quantity forming a single lot intended to be used for preparing a given number or a given quantity of doughs. After which, another batch or lot is prepared. Each batch can then be used during an interval of 24 hours and preferably 48 hours, for the production of dough or baked products. Preferably, said batch is stored at a temperature below 10° C. between the time of its preparation and its incorporation in a dough.

This so-called "batch" preparation thereby allows the baker to prepare all at once the quantity of liquid enzymatic improver needed over the next 24 hours, even the next 48 hours, from a solid improver in powder form or, preferably in the form of granules or tablets supplying a concentrate of the oxidizing agents, possibly the reducing agents, and the enzymes required for his bread-making.

In this way the baker can avoid the drawbacks of purchasing a liquid improver, all while benefiting from the advantages thereof, and in particular the ease of dosing thereof, and while minimizing the dust formation associated with the use of a solid enzymatic improver.

As indicated earlier, the baker will typically disperse the solid improver in all or part of the dough added water, generally in a small part of the dough added water. The baker can also disperse the solid improver in any liquid ingredient in his recipe containing an aqueous phase, such as yeast cream, milk, etc.

According to the invention, the solid bread-making improver can contain one or more water-soluble food ingredients belonging to the group of acetates and lactates, said two salts being commonly used and authorized in common bread-making. Other suitable ingredients are water-soluble food salts belonging to the family of fumarates, malates, citrates, propionates, phosphates, carbonates used in some countries (the United States for example) or in special bread-making (rye bread for example). It is recalled that sodium and potassium salts are generally more soluble than calcium salts. By definition, food salts are all the salts authorized as additives in the European Union (European Parliament and Council Directive No. 95/2/EC) or in the United States (Code of Federal Regulations 21—Food and Drug). Preferably, the solid improver contains one or more water-soluble food ingredients belonging to the group of lactates, acetates and citrates.

Preferably, the solid bread-making improver contains calcium acetate and/or calcium lactate. Very good results, displaying in particular a high buffering effect, have been obtained with calcium acetate, such as in particular anhydrous calcium acetate and calcium acetate having a "moisture content" (water of hydration) less than or equal to 10.2%, and preferably less than or equal to 5.0%, as water-soluble ingredient.

When the solid improver contains ascorbates, the latter have a role both as buffer ingredients and flour oxidizers, and they can totally or partially replace ascorbic acid. According to the invention, the solid improver contains ascorbic acid and/or ascorbates, in a quantity expressed as ascorbic acid equivalents having the oxidizing power required for bread-making. In the present description with the exception of the examples, and in the claims, the term "ascorbic acid" encompasses any composition consisting of ascorbic acid and/or ascorbates, having in ascorbic acid equivalents the dough oxidizing power required in the formula, it being understood that the more preferred embodiments of the invention are carried out with ascorbic acid, in the strict sense of the term, that is, in the acid form, as described in the examples.

In one embodiment of the invention, the solid bread-making improver comprises at least one enzyme selected in the group consisting of amylases, hemicellulases, glucose oxidases, amyloglucosidases, lipases, phospholipases, sulfhydryl oxidases, proteases and peroxidases; preferably, it comprises a combination of said enzymes. In a useful manner, the improver comprises at least one alpha-amylase selected in the group consisting of fungal and bacterial alpha-amylases or a combination of said alpha-amylases, in particular the improver can contain an anti-staling alpha-amylase, such as for example a maltogenic alpha-amylase. The solid improver can contain a combination of at least one alpha-amylase with at least one hemicellulase. In an advantageous manner it contains from 0.5 to 3.0% by mass of alpha-amylase(s) and from 1.0 to 30.0% by mass of hemicellulase(s), preferably from 1.0 to 2.0% by mass of alpha-amylase(s) and from 1.2 to 15.0% by mass of hemicellulase(s). Preferably, said hemicellulase is a xylanase or a mixture of xylanases.

In a useful manner, the solid improver can contain, in particular in addition to the aforementioned combination of one or more alpha-amylase(s) and one or more hemicellulase(s), a quantity of one or more glucose oxidase(s) and/or a quantity of one or more phospholipase(s) having the same technological effect as adding the mono and diacetyl tartaric esters of mono and diglycerides of fatty acids (emulsifiers E472e) employed at a dose comprised between 0.05 and 0.30% by mass to 100 parts by mass of flour (baker's percentage).

In a useful manner, the solid improver contains from 2 to 30% by mass of ascorbic acid, preferably from 5 to 20% by mass, and more preferably from 7 to 15% by mass.

The improver can also comprise other water-soluble food ingredients, and in particular such water-soluble food ingredients used in baking and particularly those which have a bread-making improver effect. Such a water-soluble food ingredient can be exemplified by L-cysteine monohydrochloride and/or sodium chloride. In a preferred manner, the solid improver according to the invention will comprise all the oxidizing agents added to the dough, possibly all the reducing agents added to the dough, all the enzymatic preparations required for the type of bread-making in question, regardless of the process, for the production of breads, Viennese pastries, sweet buns, and generally of any fermented dough.

According to the invention, the solid improver can be powdered or non-powdered. In a particularly advantageous embodiment, the improver will be in non-powdered form, preferably in granular form or in tablet form, particularly a scored tablet, preferably which rapidly dissolves in water, such as an effervescent tablet.

The solid improver in tablet form or in granule form has the advantage of reducing the risk of releasing fine particles into ambient air when manipulated in the bakery. Said forms, which in fact generate less dust, have a lower tendency to disperse in air.

In the spirit of the invention, the term tablet is understood to mean a compact solid mass of solid improver in any form obtained by compression.

Advantageously, the solid improver is in the form of granules or microgranules. The average diameter of the microgranules or granules of improver preferably ranges from 50 µm to 1000 µm, more preferably from 80 µm to 700 µm and even more preferably from 80 µm to 300 µm. In a particular embodiment, the average particle diameter of the improver will be between 50 µm and 300 µm, more preferably between 80 µm and 150 µm and even more preferably between 80 µm and 120 µm.

In an advantageous manner, the quantity of fine particles having a diameter less than 50 µm corresponds to less than 30% by mass, preferably less than 15% and more preferably less than 5% by mass of solid improver.

In the spirit of the invention, "fine particles or powder" is understood to mean particles of solid improver having a diameter less than 50 µm.

In an advantageous manner, the solid bread-making improver which can be used according to the invention is packaged for storage and transport in a hermetic container, so as to improve the storage thereof and especially to avoid any release of fine particles into ambient air during handling of the improver. Thus the improver is preferably packaged in hermetic bags, pouches or sachets, various vacuum containers or under an artificial dry atmosphere, such as for example under a nitrogen atmosphere. According to a particular embodiment, the solid bread-making improver is packaged in a packaging made of water-soluble food materials that can be incorporated into the dough, such as certain cellulose-based materials, in such a way that the liquid bread-making improver can be prepared by dispersion, in an aqueous phase, of the solid improver together with its water-soluble packaging.

In a preferred embodiment of the method of preparation of the liquid bread-making improver according to the invention, a hermetic system is used for the dispersion of the solid improver in the aqueous phase, so as to avoid any release of fine particles into ambient air. For instance, if for example the solid improver must be poured from its container into a container for dispersion in the aqueous phase, the suitable hermetic system can be equipped with a means used to block the release of fine particles into ambient air, such as for example one-way valves in the connections and/or a means of aspiration, particularly creating a negative pressure, in the dispersion container.

The invention also has as object the solid bread-making improver defined in the different embodiments described hereinabove. Said solid improver according to the invention has the important advantage of being easily dispersed in an aqueous phase, so as to obtain a liquid improver, thereby enabling the baker to benefit from the advantages of liquid improvers, all while purchasing a more compact solid improver. In particular, the invention relates to the solid improver packaged in a water-soluble food packaging that can be incorporated in the dough.

As indicated earlier, the solid improver is characterized in particular by its property of resulting in a liquid having a pH of 3.8 to 7.0; preferably 4.0 to 6.5; more preferably 4.5 to 6.3 and even more preferably 5.0 to 6.0, when it is suspended in distilled water in proportions of 10 parts of improver to 100 parts by weight of water.

The invention also has as object the liquid bread-making improver specifically obtained by suspending the solid improver defined hereinabove according to the method which is object of the invention. As indicated earlier, said liquid improver has the advantage that it can be used without significant loss of efficacy as bread-making improver, for a period of at least 24 hours, and preferably 48 hours after its preparation, particularly when it is stored at a temperature below 10° C. between the time of its preparation and its incorporation in a dough.

The invention also relates to the use in the bakery of a liquid bread-making improver for preparing baked products or dough for baked products, said liquid bread-making improver being obtained by the method of preparation according to the invention, therefore by dispersion of said solid improver such as defined hereinabove, in an aqueous liquid phase, preferably water, that is to say, in at least part of the dough added water. The liquid improver thus obtained is then incorporated in the dough.

The invention also relates to the use in the bakery of said solid improver for preparing baked products or dough for baked products, said use comprising the obtaining of a liquid improver by the method of preparation according to the invention, therefore by dispersion of said solid improver in an aqueous liquid phase, preferably water, that is to say, in at least part of the dough added water. The liquid improver thus obtained is then incorporated in the dough. The dough, which typically contains baker's yeast as fermentation agent, is for example a bread dough, a bun dough or a Viennese pastry dough.

Said use of the solid improver can allow the baker to reduce the number of ingredients that must be dosed separately. This can be achieved due to the fact that the solid improver contains several ingredients of the dough and/or by preparing the liquid improver by combining the solid improver with one or several other ingredients of the bread-making formula.

According to the invention, the liquid improver is preferably incorporated in the dough in a quantity corresponding to solid improver, in baker's percentage, of 0.01 to 1.00; preferably 0.05 to 0.50; more preferably 0.08 to 0.25; that is to say so as to obtain in the dough, per 100 kg of flour employed, from 0.01 to 1.00 kg; preferably from 0.05 to 0.50 kg and more preferably from 0.08 to 0.25 kg of solid improver. Baker's percentage is a mass percentage of an ingredient calculated with reference to 100 parts by mass of the flour employed.

Preferably, the solid improver is dispersed in the aqueous phase so as to obtain a liquid enzymatic improver containing from 1 to 25% by mass, preferably from 3 to 20% by mass and more preferably from 6 to 12% by mass of solid improver.

Thanks to the specific composition of the solid improver, the baker can thus easily prepare a liquid bread-making improver in the bakery. By preparing the liquid improver in batch, that is to say, for example, by preparing all at once a quantity of liquid improver sufficient for several batches of baker's dough, or even by preparing, all at once, a quantity of liquid improver sufficient for one day or longer, the baker can minimize the drawbacks of solid improvers.

The invention also relates to a method for preparing a dough for a baked product. Said inventive method comprises the dispersion, in an aqueous liquid phase, preferably water, of a solid improver according to the invention, so as to obtain a liquid enzymatic improver, and the incorporation of a quantity of said liquid improver in the dough. The invention also relates to a method for preparing a baked product. Said method comprises dispersing in an aqueous liquid phase, preferably water, a solid improver according to the invention, so as to obtain a liquid enzymatic improver, incorporating a quantity of said liquid improver in the dough, and baking the dough obtained.

In said methods according to the invention, the liquid improver is advantageously incorporated in the dough in a quantity corresponding to solid improver, in baker's percentage, of 0.01 to 1.00; preferably 0.05 to 0.50; more preferably 0.08 to 0.25; that is to say so as to obtain in the dough, for 100 kg of flour employed, from 0.01 to 1.00 kg; preferably from 0.05 to 0.50 kg and more preferably from 0.08 to 0.25 kg of solid improver.

In a preferred manner, the liquid improver contains from 1 to 25% by mass, preferably from 3 to 20% by mass and more preferably from 6 to 12% by mass of solid improver. In a preferred manner, between the dispersion of the solid improver in the aqueous liquid phase and its incorporation in the dough, the liquid improver is preferably stored at a temperature of 10° C. or below, preferably from 2° C. to 4° C.

The liquid improver can be incorporated in the dough for at least up to 24 hours, preferably for at least up to 48 hours following its preparation by dispersion of the solid improver in the aqueous liquid phase. The dough in which the liquid improver is incorporated can contain baker's yeast as fermentation agent. In this case, the dough containing the quantity of liquid improver is subjected to a dough fermentation step by the baker's yeast.

The dough can be a fermented dough, preferably selected in the group consisting of bread doughs, sweet bun doughs or Viennese pastry doughs, said doughs being usable in direct, prebaked or frozen baking technologies.

According to the invention, the solid improver can also be dispersed in yeast cream, that is to say, in an aqueous suspension of baker's yeast cells, before being incorporated in the dough.

The dough for baked products can be prepared in particular by so-called direct "straight dough" bread-making processes or by indirect processes like the "Sponge and Dough" process ("levain-levure" in French), the "No Time Dough" process ("sans temps de fermentation de la pâte en masse" in French) or by any other bread-making process.

Preferably, the solid improver according to the invention and the methods according to the invention employing said solid improver, are respectively improvers for French breads and methods for the production of French breads, that is to say breads which contain neither fat nor added sugar.

More generally, the solid improver and the methods according to the invention employing said solid improver are used for preparing doughs or baked products, in particular bread of the French type, preferably common French bread, that is to say, bread which contains neither fat nor added sugar in accordance with French custom, for the production of Viennese pastries, sweet buns, special breads, and in general, for preparing any non-French breads containing fat and/or added sugar. Thus, the solid improver and the methods according to the invention are also suited to producing dough or baked products such as produced in the United States for example, that is to say preferably containing a quantity of added sugar ranging from 4 to 16% of dry matters in baker's percentage, and/or a quantity of added fat, for example oil, ranging from 2 to 6% in baker's percentage and in particular those obtained by the Sponge and Dough or No Time Dough process.

EXAMPLES

The solid improver according to the invention can advantageously be used in a large number of applications. Examples illustrating the solid improver and the applications thereof are given hereinbelow.

Example 1

Examples of Composition of the Solid Improver

TABLE 1

| Composition | Improver 1: ex. of composition (% by mass) | Improver 2: ex. of composition (% by mass) | Improver 3: ex. of composition (% by mass) |
|---|---|---|---|
| Calcium acetate | 86.5 | 77.5 | 83.0 |
| Alpha-amylase | 1.0 | 1.0 | 2.0 |
| Ascorbic acid* | 10.0 | 10.0 | 10.0 |
| Hemicellulase | 2.5 | 2.5 | 3.0 |
| Glucose oxidase | — | 4.5 | — |
| Phospholipase | — | 4.5 | — |
| L-cysteine monohydrochloride | — | — | 2.0 |

*Ascorbic acid is ascorbic acid in the strict sense of the term, that is, entirely in acid form.

Example 2

Preparation of the Liquid Enzymatic Improver from the Solid Improver 100 g of each of the three solid improvers described in example 1 were dispersed in 1 liter (=1000 g) of distilled water. Dispersion was carried out by stirring with a magnetic bar (laboratory scale) or blade (industrial scale in the bakery).

The pH of the three liquid improvers thus obtained and their buffering power are given in Table 2 below.

TABLE 2

|  | Improver 1 | Improver 2 | Improver 3 |
|---|---|---|---|
| pH of solution obtained by dispersion at 10% | 5.56 | 5.60 | 5.48 |
| pH obtained after addition of 1 ml of 1N HCl to 110 g of solution obtained by dispersion at 10% | 5.49 | 5.52 | 5.42 |
| Δ pH (absolute value) | 0.07 | 0.08 | 0.06 |

The liquid improver thus obtained can be stored without stirring at 10° C. for 24 or 48 hours.

Example 3

Analysis of Solubility and Enzymatic Stability of Two Improvers Over 48 Hours The solubility and enzymatic stability study concerned the water-soluble improvers 1 and 2 described in example 1. The solid improvers were dispersed in distilled water in a proportion of 100 g of powder to 1000 g of distilled water, in 1 liter flasks.

Dispersion was carried out by magnetic stirring for 15 minutes. The two solutions thus obtained were placed in a refrigerated chamber at 10° C. for 48 hours.

Samples were taken from the surface and bottom of the flasks at T=0 h, T=24 h and T=48 h and the enzymatic activities in the different improvers was assayed in the samples.

During 48 hours of storage, no vertical gradient of enzymatic activity was observed in the liquid phases.

Example 4

Example of Use of the Liquid Improver

Bread-making of the French type in the strict sense of the term, that is to say bread-making methods wherein the dough contains neither fat nor added sugar, is very restrictive for the baker, who must offer fresh bread which has been baked at 7 in the morning or earlier.

A baker's bread-making formula which can be used with said improver is as follows:

TABLE 3

|  | Baker's percentage | |
|---|---|---|
| Baker's formula | A | B |
| Wheat flour | 100.0 | 100.0 |
| Water | 64.0 | 63.0 |
| Salt | 2.0 | 2.0 |
| Compressed yeast | 2.0 | 2.0 |
| Solid improver, powder | 0.1 | |

TABLE 3-continued

|  | Baker's percentage | |
|---|---|---|
| Baker's formula | A | B |
| Liquid improver 10 parts by weight of solid improver to 100 parts by weight of water | | 1.1 |

The recipe was employed in the following bread-making process:
1. Place the ingredients in the tank of a spiral kneader.
2. Begin kneading according to the following program:
   a. first speed for 4 minutes
   b. second speed for 5 minutes.
3. A dough is obtained having a temperature of 24.5° C.±0.5° C.
4. Bulk fermentation for 20 minutes.
5. Divide into 350 g dough pieces.
6. Dough shaping.
7. Small loaf proofing (wood proofing chamber) at room temperature at 23° C.
8. Bake in a hearth oven at 215/230° C. for 32 minutes.
9. Measure the volume of the loaves after cooling for at least 1 hour and evaluate the scoring of breads so produced.

The bread-making tests were carried out:
- either directly with the solid improvers 1 and 2 as described in example 1 at a baker's percentage of 0.1% (Table 3, column A),
- or with the corresponding liquid improvers 1 and 2 as described in example 2, said liquid improvers being used at a baker's percentage of 1.1% (Table 3, column B).

The specific volumes of the bread obtained with the liquid improvers were compared with the specific volumes of the bread obtained with the corresponding solid improvers.

These tests also made it possible to evaluate the storage behavior of the liquid improvers, by initiating bread-making immediately after constitution of the improver in liquid form, and after 24 hours and 48 hours of storage at a temperature below 10° C.

TABLE 4

|  | Improver with composition 1 | Improver with composition 2 |
|---|---|---|
| Solid improver | C | C |
| Liquid improver at T = 0 h | −0.5% | −0.6% |
| Liquid improver at T = 24 h | +0.2% | −0.8% |
| Liquid improver at T = 48 h | −0.9% | −1.0% |

C = control

The quality and specific volumes of the French bread of the small loaf type obtained with improvers 1 and 2 were not significantly different when the solid improver was used as is or when it was used in the form of a liquid improver obtained by dispersion of the solid improver in water, and this remained true after storage of the liquid improver for 48 hours at a temperature below 10° C.

The invention claimed is:

1. A method for preparing, in a bakery, a liquid bread-making improver, the method consisting of:
   dispersing a solid bread-making improver in water;
   wherein the liquid bread-making improver obtained is enzymatically stable for 24 to 48 hours following preparation when stored in liquid form at a temperature below 10° C.; and wherein said solid bread-making improver:
consists of ascorbic acid, at least one enzyme and at least one water-soluble food ingredient,
wherein the at least one enzyme is selected from the group consisting of amylases, hemicellulases, glucose oxidases, amyglycosidases, lipases, phospholipases, sulfhydryl oxidases, peroxidases, and any combination thereof, and
wherein the at least one water-soluble food ingredient is selected from the group consisting of carbonates, phosphates, acetates, lactates, citrates, malates, fumarates, propionates, L-cysteine monohydrochloride, sodium chloride, and any combination thereof;
has a dry matter content greater than or equal to 80% by mass, said dry matter consisting of ascorbic acid, the at least one enzyme and the at least one water-soluble food, wherein the dry matter consists of at least 90% by mass of the at least one enzyme and the at least one water-soluble food ingredient and at most 10% by mass of ascorbic acid; and
wherein dispersing 10 parts by weight of said solid bread-making improver in 100 parts by weight of distilled water results in a liquid having:
a pH of 3.8 to 7.0; and
a buffer power such that the addition of 1 ml of 1N HCl to 110 g of said liquid produces a pH variation less than or equal to 0.5.

2. The method according to claim 1, wherein the solid bread-making improver is in non-powder form or in tablet form.

3. The method according to claim 1, wherein the solid bread-making improver displays at least one of the following characteristics a and b:
a) a dry matter content greater than or equal to 90% by mass;
b) the dry matter consists of at least 95% by mass of the at least one enzyme and the at least one water-soluble food ingredient, and at most 5% by mass of ascorbic acid.

4. The method according to claim 3, wherein the solid bread-making improver displays the two characteristics a and b.

5. The method according to claim 1, wherein the at least one water-soluble food ingredient is selected from the group consisting of calcium acetate, calcium lactate, and any combination thereof.

6. The method according to claim 1, wherein the at least one enzyme contains from 0.5 to 3.0% by mass of at least one alpha-amylase and from 1.0 to 30.0% by mass of at least one hemicellulase.

7. The method according to claim 1, wherein the liquid bread-making improver contains from 1 to 25% by mass of solid bread-making improver.

8. The method according to claim 1, wherein the liquid bread-making improver is prepared in batch.

9. A method for preparing a dough for a baked product, the method comprising steps of:
preparing a liquid bread-making improver according to the method of claim 1; and
incorporating a quantity of said liquid bread-making improver in the dough.

10. The method according to claim 9, wherein the dough is a fermented dough.

11. A method for preparing a baked product, said method comprising steps of:
preparing a liquid bread-making improver according to the method of claim 1, incorporating a quantity of said liquid bread-making improver in the dough, and baking the dough.

12. The method according to claim 9, wherein the liquid bread-making improver is incorporated in the dough in a quantity corresponding to a quantity of solid bread-making improver of 0.01 to 1.00 in baker's percentage.

13. The method according to claim 11, wherein the liquid bread-making improver is incorporated in the dough in a quantity corresponding to a quantity of solid bread-making improver of 0.01 to 1.00 in baker's percentage.

14. The method according to claim 9, wherein the liquid bread-making improver is used within a period of 24 hours following its preparation.

15. The method according to claim 9, wherein the liquid bread-making improver is stored at a temperature below 10° C. between the time of its preparation and its incorporation in the dough.

16. A solid bread-making improver, wherein said solid bread-making improver:
consists of ascorbic acid, at least one enzyme and at least one water-soluble food ingredient,
wherein the at least one enzyme is selected from the group consisting of amylases, hemicellulases, glucose oxidases, amyglycosidases, lipases, phospholipases, sulfhydryl oxidases, peroxidases, and any combination thereof, and
wherein the at least one water-soluble food ingredient is selected from the group consisting of carbonates, phosphates, acetates, lactates, citrates, malates, fumarates, propionates, L-cysteine monohydrochloride, sodium chloride, and any combination thereof;
has a dry matter content greater than or equal to 80% by mass, said dry matter consisting of ascorbic acid, the at least one enzyme and the at least one water-soluble food, wherein the dry matter consists of at least 90% by mass of the at least one enzyme and the at least one water-soluble food ingredient and at most 10% by mass of ascorbic acid; and
wherein dispersing 10 parts by weight of said bread-making improver in 100 parts by weight of distilled water results in a liquid having:
a pH of 3.8 to 7.0; and
a buffer power such that the addition of 1 ml of 1N HCl to 110 g of said liquid produces a pH variation less than or equal to 0.50.

17. The solid bread-making improver according to claim 16, wherein said solid bread-making improver displays at least one of the following characteristics a and b:
a) a dry matter content greater than or equal to 90% by mass;
b) the dry matter consists of at least 95% by mass of the at least one enzyme and the at least one water-soluble food ingredient, and at most 5% by mass of ascorbic acid.

18. The solid bread-making improver according to claim 16, wherein the solid bread-making improver displays the two characteristics a and b.

19. The solid bread-making improver according to claim 16, wherein the solid bread-making improver is in non-powder form or in tablet form.

20. The solid bread-making improver according to claim 16, wherein the solid bread-making improver is in the form of particles the average diameter of which is comprised between 50 μm and 1000 μm.

21. The solid bread-making improver according to claim 16, wherein to less than 30% by mass of said solid bread-making improver is under the form of particles having a diameter of less than 50 μm.

22. The solid bread-making improver according to claim 16, wherein the at least one water-soluble food ingredient is selected from the group consisting of calcium acetate, calcium lactate, or any combination thereof.

23. The solid bread-making improver according to claim 16, wherein the at least one enzyme comprises at least one fungal alpha-amylase, at least one bacterial alpha-amylase or a combination thereof.

24. The solid bread-making improver according to claim 16, wherein the at least one enzyme comprises at least one maltogenic alpha-amylase.

25. The solid bread-making improver according to claim 16, wherein the at least one enzyme comprises from 0.5 to 3.0% by mass of at least one alpha-amylase and from 1.0 to 30.0% by mass of at least one hemicellulase.

26. The solid bread-making improver according to claim 16, wherein the at least one enzyme comprises at least one alpha-amylase and at least one hemicellulase.

27. A liquid bread-making improver obtained by dispersion, in water, of a solid bread-making improver, wherein said liquid bread-making improver is enzymatically stable for 24 to 48 hours following preparation when stored in liquid form at a temperature below 10° C., and wherein said solid bread-making improver is a solid bread-making improver of claim 16.

28. The liquid bread-making improver according to claim 27, wherein the solid bread-making improver displays at least one of the following characteristics a and b:
   a) a dry matter content greater than or equal to 90% by mass;
   b) the dry matter consists of at least 95% by mass of the at least one enzyme and the at least one water-soluble food ingredient, and at most 5% by mass of ascorbic acid.

29. The liquid bread-making improver according to claim 27, wherein said liquid bread-making improver contains from 1 to 25% by mass of the solid bread-making improver.

30. The method according to claim 1, wherein the solid bread-making improver is packaged in a packaging material made of water-soluble food materials and the dispersion of the solid bread-making improver in water is performed by dispersing the packaged solid bread-making improver together with its packaging material in water.

31. The solid bread-making improver according to claim 16, wherein said solid bread-making improver is packaged in a packaging material made of water-soluble food materials.

32. The liquid bread-making improver according to claim 27, wherein the solid bread-making improver is packaged in a packaging material made of water-soluble food materials and the dispersion of the solid bread-making improver in water is performed by dispersing the packaged solid bread-making improver together with its packaging material in water.

33. The method according to claim 10, wherein the fermented dough is selected from the group consisting of bread doughs, sweet bun doughs and Viennese pastry doughs.

* * * * *